(12) United States Patent
Imaoka

(10) Patent No.: US 9,152,111 B2
(45) Date of Patent: Oct. 6, 2015

(54) ELECTRONIC EQUIPMENT

(71) Applicant: KYOCERA Document Solutions Inc., Osaka-shi, Osaka (JP)

(72) Inventor: Kunio Imaoka, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/192,033

(22) Filed: Feb. 27, 2014

(65) Prior Publication Data

US 2014/0241745 A1     Aug. 28, 2014

(30) Foreign Application Priority Data

Feb. 28, 2013   (JP) ................................. 2013-038488

(51) Int. Cl.
*G03G 15/20*   (2006.01)
*G03G 15/00*   (2006.01)
*G06F 1/32*    (2006.01)

(52) U.S. Cl.
CPC .......... *G03G 15/5004* (2013.01); *G06F 1/3284* (2013.01)

(58) Field of Classification Search
USPC .......................................................... 399/67
See application file for complete search history.

(56) References Cited

U.S. PATENT DOCUMENTS

| 6,177,739 B1 * | 1/2001 | Matsudaira et al. .......... 307/125 |
| 7,106,468 B2 * | 9/2006 | Jinbo et al. .................... 358/1.15 |
| 2008/0062150 A1 * | 3/2008 | Lee .................................. 345/175 |
| 2011/0058206 A1 * | 3/2011 | Park et al. ..................... 358/1.14 |
| 2012/0030491 A1 * | 2/2012 | Itou ................................ 713/323 |
| 2012/0134708 A1 * | 5/2012 | Asaka ............................. 399/97 |

FOREIGN PATENT DOCUMENTS

JP      2004-233413       8/2004

* cited by examiner

*Primary Examiner* — Clayton E Laballe
*Assistant Examiner* — Linda B Smith
(74) *Attorney, Agent, or Firm* — Gerald E. Hespos; Michael J. Porco; Matthew T. Hespos

(57) ABSTRACT

An electric power control unit alternately repeats a first electric power control period and a second electric power control period when a low electric power mode is set by a mode setting unit. When a sleep mode is set by the mode setting unit, a second electric power control is executed.

7 Claims, 7 Drawing Sheets

ELECTRONIC EQUIPMENT

This application is based on Japanese Patent Application No. 2013-038488 filed on Feb. 28, 2013, the contents of which are hereby incorporated by reference.

BACKGROUND

The present disclosure relates to an electronic equipment having the functions of electric power saving modes.

Some of the image forming apparatus as electronic equipments have the function of a low electric power mode, and the function of a sleep mode in which electric power consumption is smaller than in the low electric power mode, as electric power saving modes. In the sleep mode, a fixing roller is not heated. Accordingly, it is possible to remarkably reduce the electric power consumption.

In the sleep mode, however, the temperature of the fixing roller may be lowered to a temperature close to ambient temperature. Accordingly, it takes a time to recover the image forming apparatus from the sleep mode to the ready mode (i.e. an electric power mode in which printing can be readily performed in response to receiving a print instruction).

In view of the above, in the case where a print instruction is not received for a predetermined period when the image forming apparatus is in the ready mode, the image forming apparatus is switched from the ready mode to the low electric power mode, without directly switching the image forming apparatus from the ready mode to the sleep mode; and in the case where a recovery instruction indicating that the image forming apparatus is recovered to the ready mode is not received for a predetermined period when the image forming apparatus is in the low electric power mode, the image forming apparatus is switched from the low electric power mode to the sleep mode. When the image forming apparatus is in the low electric power mode, the temperature of the fixing roller is set to a temperature lower than the temperature of the fixing roller when the image forming apparatus is in the ready mode.

For instance, in the conventional art, there is proposed an image forming apparatus configured such that in the case where the image forming apparatus is switched from the ready mode to the low electric power mode, and in the case where the image forming apparatus is switched from the low electric power mode to the sleep mode, the temperature of the fixing roller is controlled to be gradually lowered in order to shorten a wait time until the image forming apparatus is recovered to the ready mode and to reduce the electric power consumption.

SUMMARY

An object of the present disclosure is to provide an electronic equipment that enables to reduce the electric power consumption thereof when the electronic equipment is in an electric power saving mode, in the case where the electronic equipment is provided with the functions of a plurality of electric power modes whose electric power consumptions differ from each other, as electric power saving modes.

An electronic equipment according to an aspect of the present disclosure is an electronic equipment configured to control electric power consumption of the electronic equipment. The electronic equipment is provided with an electric power control unit configured to execute an ordinary electric power control, as an electric power control of an ordinary mode, and configured to selectively execute a first electric power control and a second electric power control as electric power controls of electric power saving modes, the first electric power control being such that the electric power consumption is smaller than in the ordinary electric power control, the second electric power control being such that the electric power consumption is smaller than in the first electric power control; a recovery receiving unit configured to receive a recovery instruction indicating that the electronic equipment is recovered from the electric power saving mode to the ordinary mode; and a mode setting unit configured to selectively set a first power saving mode and a second power saving mode as the electric power saving modes, and configured to switch setting of the electronic equipment from the first power saving mode to the second power saving mode when a predetermined period is elapsed without receiving the recovery instruction by the recovery receiving unit after the electronic equipment is set to the first power saving mode. The electric power control unit executes an energy-saving control having a first electric power control period and a second electric power control period when the first power saving mode is set by the mode setting unit, and executes the second electric power control when the second power saving mode is set by the mode setting unit.

These and other objects, features and advantages of the present disclosure will become more apparent upon reading the following detailed description along with the accompanying drawings.

DETAILED DESCRIPTION

Figure 1:
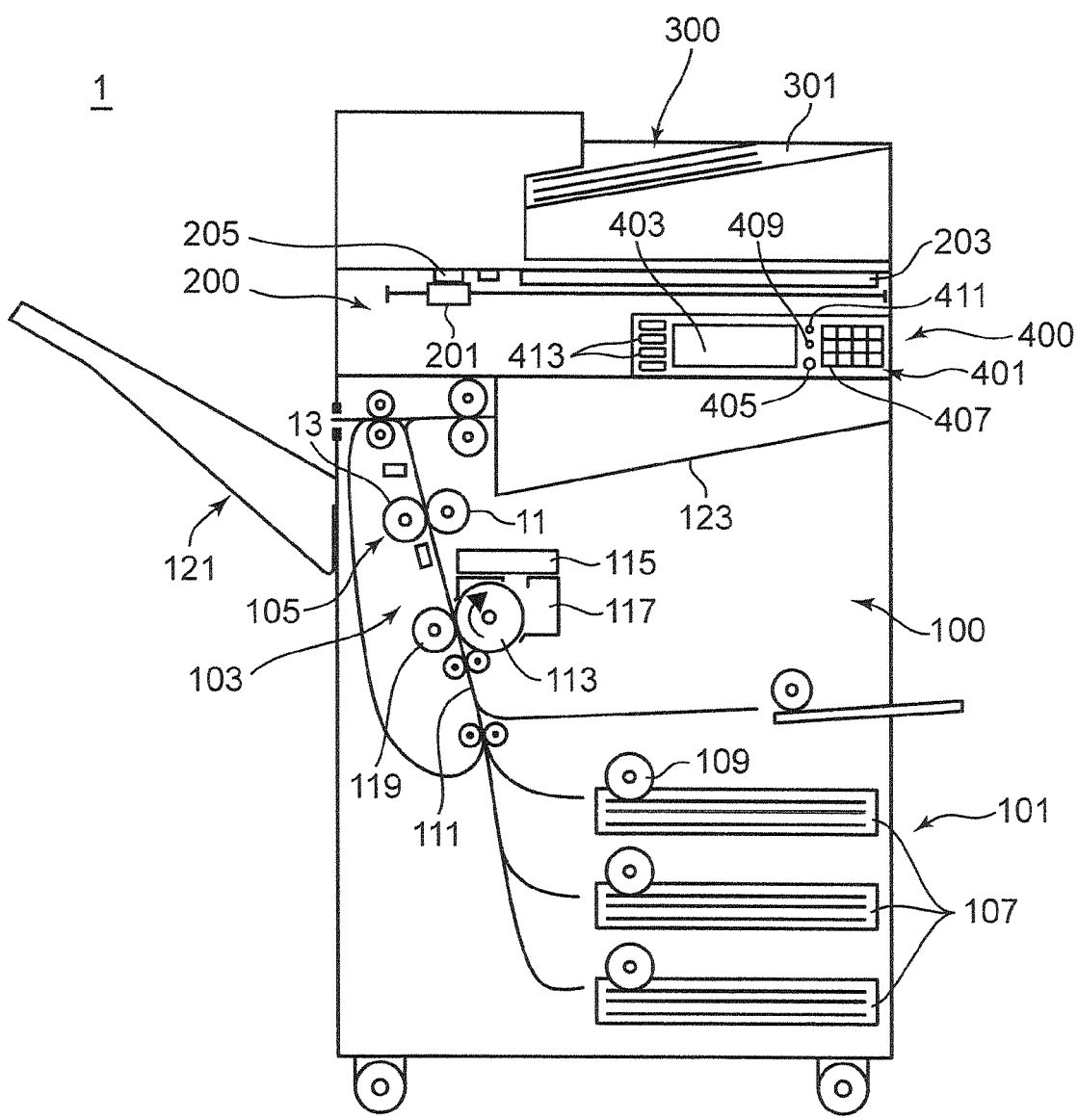
FIG. 1 is a diagram schematically illustrating an internal structure of an image forming apparatus (an electronic equipment) according to a first embodiment.

In the following, embodiments of the present disclosure are described in detail referring to the drawings. FIG. 1 is a diagram schematically illustrating an internal structure of an image forming apparatus 1 according to a first embodiment of the present disclosure. The image forming apparatus 1 as an electronic equipment is applicable to a digital complex machine having the functions of a copying machine, a printer, a scanner, and a facsimile machine. The image forming apparatus 1 is provided with an apparatus body 100, a document reading unit 200 disposed above the apparatus body 100, a document feeding unit 300 disposed above the document reading unit 200, and an operating unit 400 disposed on a front surface of an upper portion of the apparatus body 100.

The document feeding unit 300 functions as an automatic document feeder, and is configured to automatically feed documents placed on a document setting unit 301 so that the documents are sequentially read by the document reading unit 200.

The document reading unit 200 is provided with a carriage 201 on which an exposure lamp is loaded, a document platen 203 constituted of a transparent glass platen, an unillustrated CCD (Charge Coupled Device) sensor, and a document reading slit 205. In the case where a document placed on the document platen 203 is read, the document is read by the CCD sensor while moving the carriage 201 in the longitudinal direction of the document platen 203. On the other hand, in the case where a document fed from the document feeding unit 300 is read, the carriage 201 is moved to a position facing the document reading slit 205, and the document fed from the document feeding unit 300 is read by the CCD sensor through the document reading slit 205. The CCD sensor outputs the read document as image data.

The apparatus body 100 is provided with a sheet storing unit 101, an image forming unit 103, and a fixing unit 105. The sheet storing unit 101 is disposed at a lowermost portion of the apparatus body 100, and is provided with a sheet tray 107 configured to store a stack of sheets. An uppermost sheet of the sheet stack stored in the sheet tray 107 is fed toward a sheet conveying path 111 by driving a pickup roller 109. The sheet is conveyed to the image forming unit 103 along the sheet conveying path 111.

The image forming unit 103 forms a toner image on a conveyed sheet. The image forming unit 103 is provided with a photosensitive drum 113, an exposure unit 115, a developing unit 117, and a transfer unit 119. The exposure unit 115 generates light modulated in accordance with image data (image data output from the document reading unit 200, image data transmitted from a personal computer, image data transmitted from a facsimile machine, and the like), and irradiates the light onto a uniformly charged circumferential surface of the photosensitive drum 113. By irradiation of the light, an electrostatic latent image corresponding to the image data is formed on the circumferential surface of the photosensitive drum 113. By supply of toner from the developing unit 117 to the circumferential surface of the photosensitive drum 113 in the above state, a toner image corresponding to the image data is formed on the circumferential surface of the photosensitive drum 113. The toner image is transferred to the sheet conveyed from the sheet storing unit 101 by the transfer unit 119.

The sheet carrying the transferred toner image is fed to the fixing unit 105. In the fixing unit 105, the toner image is fixed onto the sheet by applying heat and a pressure to the sheet carrying the transferred toner image. Thereafter, the sheet is discharged onto a stack tray 121 or onto a discharge tray 123.

The operating unit 400 is provided with an operation key unit 401 and a display unit 403. The display unit 403 has a touch panel function, and is configured to display a screen including soft keys. The user is allowed to perform setting necessary for execution of the functions such as copying by operating the soft keys while viewing the screen.

The operation key unit 401 is provided with operation keys constituted of hard keys. Specifically, the operation key unit 401 is provided with a start key 405, a numeric keypad 407, a stop key 409, a reset key 411, function switching keys 413 for switching the functions between a copying machine, a printer, a scanner, and a facsimile machine.

The start key 405 is a key for allowing the user to start an operation of copying, facsimile transmission, and the like. The numeric keypad 407 is a key unit for allowing the user to input the numbers such as the number of copies to be printed, or a facsimile number. The stop key 409 is a key for allowing the user to stop a copying operation and the like. The reset key 411 is a key for allowing the user to return the set contents to an initial set state.

The function switching keys 413 include a copy key and a transmission key, and are the keys for allowing the user to switch between the copying function, the transmission function, and the like. When the copy key is operated, an initial screen of copying is displayed on the display portion 403. When the transmission key is operated, an initial screen of facsimile transmission and e-mail transmission is displayed.

Figure 2:
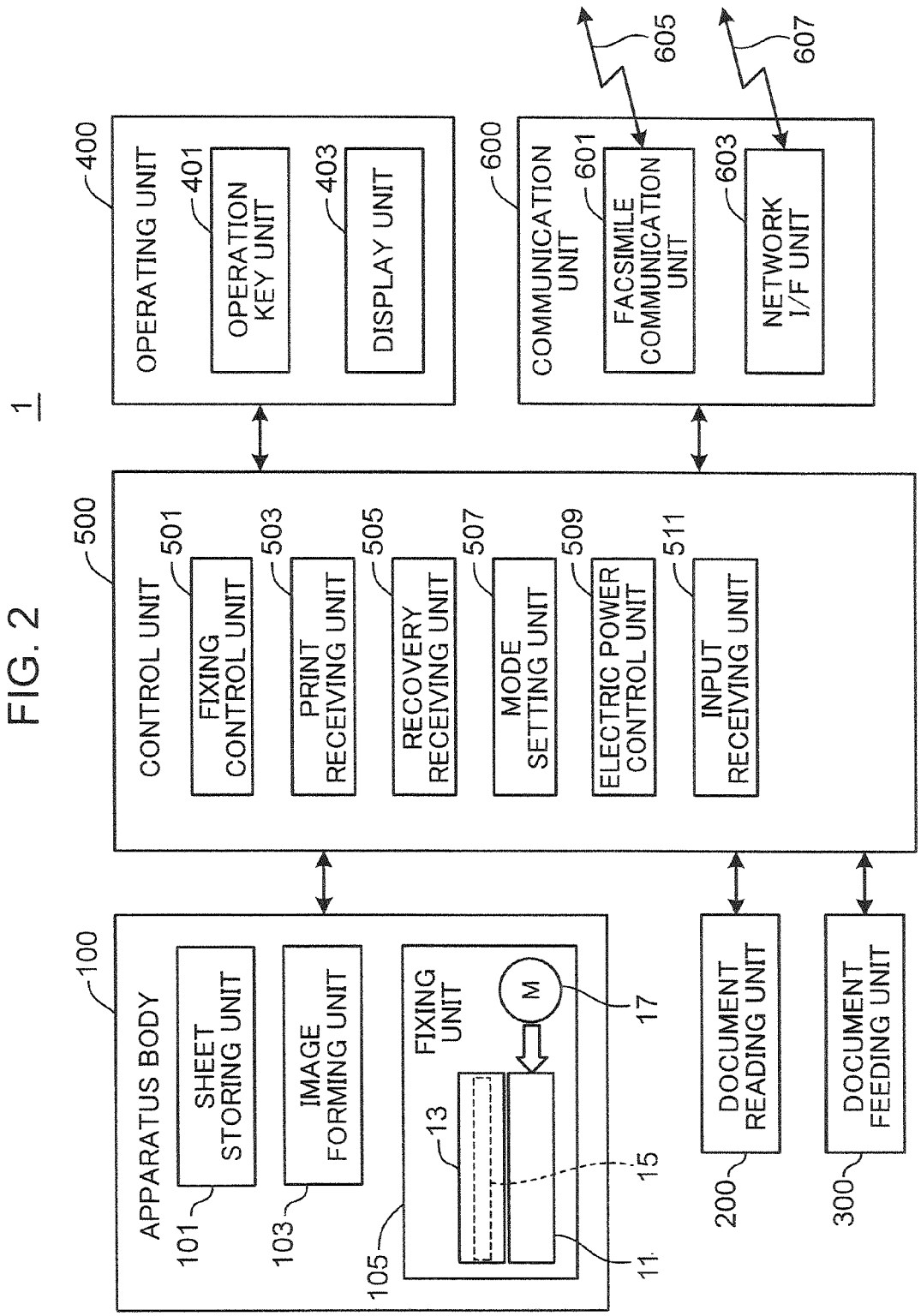
FIG. 2 is a block diagram illustrating a configuration of the image forming apparatus according to the first embodiment.

FIG. 2 is a block diagram illustrating a configuration of the image forming apparatus 1 according to the first embodiment. The image forming apparatus 1 is configured such that the apparatus body 100, the document reading unit 200, the document feeding unit 300, the operating unit 400, a control unit 500, and a communication unit 600 are connected with each other by a bus. Since the document reading unit 200, the document feeding unit 300, and the operating unit 400 have been described above, the repeated description thereof is omitted herein.

The control unit 500 is provided with a CPU (Central Processing Unit), a ROM (Read Only Memory), a RAM (Random Access Memory), and an image memory. The CPU controls the respective constituent elements of the image forming apparatus 1 such as the apparatus body 100 to perform an operation necessary for operating the image forming apparatus 1. The ROM stores therein a software necessary for controlling the operation of the image forming apparatus 1. The RAM is used for temporarily storing data to be generated at the time of execution of a software, and for storing an application software. The image memory temporarily stores image data (image data output from the document reading unit 200, image data transmitted from a personal computer, image data transmitted from a facsimile machine, and the like).

The control unit 500 is provided with a fixing control unit 501, a print receiving unit 503, a recovery receiving unit 505, a mode setting unit 507, an electric power control unit 509, and an input receiving unit 511 as functional blocks. The details of the functional blocks will be described later.

The communication unit 600 is provided with a facsimile communication unit 601 and a network I/F unit 603. The facsimile communication unit 601 is provided with an NCU (Network Control Unit) configured to control connection of a telephone line to a destination facsimile machine, and a modulation/demodulation circuit configured to modulate and demodulate a signal for facsimile communications. The facsimile communication unit 601 is connected with a telephone line 605.

The network I/F unit 603 is connected to a LAN (Local Area Network) 607. The network I/F unit 603 is a communication interface circuit configured to perform communications with a terminal device such as a personal computer, which is connected to the LAN 607.

The fixing unit 105 is additionally described. The fixing unit 105 is provided with a fixing roller 11, a pressing roller 13, a heater 15, and a motor 17. A toner image is fixed on a sheet by allowing the sheet having the toner image formed thereon to pass a nip portion formed by the fixing roller 11 and the pressing roller 13.

The fixing roller 11 has a tubular shape, and the heater 15 extending in the longitudinal direction of the fixing roller 11 is disposed in the inside of the tubular-shaped fixing roller 11.

The motor 17 generates power for rotating the fixing roller 11 and the pressing roller 13. In executing printing, the motor 17 is controlled to be driven by the fixing control unit 501 to be described later to thereby rotate the fixing roller 11, and the pressing roller 13 is rotated in accordance with the rotation of the fixing roller 11.

As described above, the fixing unit 105 includes a feeding portion (the fixing roller 11, the pressing roller 13, and the motor 17) configured to feed a sheet having a toner image formed thereon while applying a pressure to the sheet, and a heating portion (the heater 15 and the fixing roller 11) configured to apply heat to the sheet having the toner image formed thereon so as to fix the toner image formed on the sheet onto the sheet while applying the heat and the pressure to the sheet.

In the following, the functional blocks of the control unit 500 are described referring to FIG. 1 and FIG. 2. The fixing control unit 501 controls the fixing unit 105. Specifically, the fixing control unit 501 controls the temperature of the fixing roller 11, and controls the sheet feeding speed at which a sheet is fed by the fixing roller 11 and the pressing roller 13.

The print receiving unit 503 receives a print instruction when the image forming apparatus 1 is in the copy mode or in the printer mode. Specifically, for instance, when the image forming apparatus 1 is in the copy mode, in response to a user operation of pressing the start key 405 in a state that a document is set on the document platen 203 or on the document feeding unit 300, the print receiving unit 503 receives a print instruction.

The recover receiving unit 505 receives an instruction indicating that the image forming apparatus 1 is recovered from an electric power saving mode. Specifically, in response to a user operation of pressing one of the keys of the operation key unit 401 when the image forming apparatus 1 is in a low electric power mode as a first power saving mode or in a sleep mode as a second power saving mode, the recovery receiving unit 505 receives a recovery instruction indicating that the image forming apparatus 1 is recovered to a ready mode. Further, in response to receiving a print instruction when the image forming apparatus 1 is in the low electric power mode or in the sleep mode, the print receiving unit 503 causes the recovery receiving unit 505 to receive a recovery instruction indicating that the image forming apparatus 1 is recovered to the ready mode. Thus, the recovery receiving unit 505 receives a recovery instruction indicating that the image forming apparatus 1 is recovered to the ready mode.

The mode setting unit 507 selectively sets the ready mode (ordinary electric power mode), the low electric power mode (first power saving mode), and the sleep mode (second power saving mode).

The ready mode is a mode in which the image forming apparatus 1 is ready to print in response to receiving a print instruction by the print receiving unit 503.

The low electric power mode is a mode in which the temperature of the fixing roller 11 is lowered than in the ready mode. By setting the image forming apparatus 1 to the low electric power mode, it is possible to reduce the electric power consumption, although the time required for the image forming apparatus 1 to start printing after a print instruction is received by the print receiving unit 503 is extended.

The sleep mode is a mode in which the fixing roller 11 is not heated. By setting the image forming apparatus 1 to the sleep mode, it is possible to further reduce the electric power consumption, as compared with the case of the low electric power mode.

The mode setting unit 507 is configured to switch the image forming apparatus 1 from the ready mode to the low electric power mode, when a predetermined ready mode period is elapsed without receiving a print instruction by the print receiving unit 503 after the image forming apparatus 1 is set to the ready mode.

The mode setting unit 507 is configured to switch the image forming apparatus 1 from the low electric power mode to the sleep mode, when a predetermined low electric power mode period (a predetermined period) is elapsed without receiving a recovery instruction by the recovery receiving unit 505 after the image forming apparatus 1 is set to the low electric power mode.

The electric power control unit 509 executes an ordinary electric power control, and selectively executes a first electric power control and a second electric power control, as electric power controls of the electric power saving modes.

The ordinary electric power control is an electric power control of the ready mode; and includes an electric power control of heating the fixing roller 11 by the heater 15, and an electric power control of causing the display unit 403 to display an operation screen.

The first electric power control includes an electric power control of heating the fixing roller 11 by the heater 15 at a temperature lower than the temperature in the ordinary electric power control, but does not include an electric power control of causing the display unit 403 to display an operation screen. The first electric power control is such that the electric power consumption of the image forming apparatus 1 is small, as compared with the ordinary electric power control.

The second electric power control does not include both of the electric power control of heating the fixing roller 11 by the heater 15, and the electric power control of causing the display unit 403 to display an operation screen. As described above, the electric power control unit 509 activates the heater 15 (a heating portion) by the first electric power control, and de-activates the heater 15 by the second electric power control. Accordingly, the second electric power control is such that the electric power consumption of the image forming apparatus 1 is small, as compared with the first electric power control.

Figure 3:
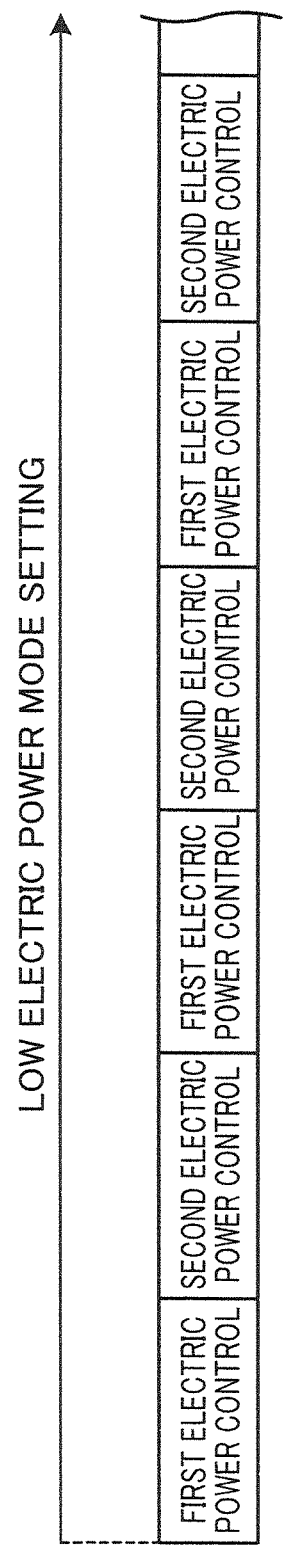
FIG. 3 is a diagram illustrating an electric power control to be executed when the image forming apparatus is set to a low electric power mode.

As illustrated in FIG. 3, the electric power control unit 509 executes an energy-saving control having a first electric power control period and a second electric power control period, when the low electric power mode is set by the mode setting unit 507. The electric power control unit 509 selectively executes the first electric power control and the second electric power control. Accordingly, the first electric power control period and the second electric power control period do not overlap each other.

The energy-saving control is such that the first electric power control period and the second electric power control period are alternately repeated. The energy-saving control is not limited to the above, but may be such that the second electric power control period is provided only one time in the low electric power mode period, and the rest of the low electric power mode period may be the first electric power control period.

According to the first embodiment as described above, the energy-saving control is executed when the low electric power mode is set by the mode setting unit 507. Specifically, the first electric power control is executed in the low electric power mode period, and the second electric power control whose electric power consumption is smaller than in the first electric power control is executed in a period of the low electric power mode period other than the first electric power control period. Accordingly, as compared with a configuration in which the first electric power control is executed in the whole period of the low electric power mode, the above configuration makes it possible to reduce the electric power consumption when the image forming apparatus is in the low electric power mode. Thus, the first embodiment is advantageous in reducing the electric power consumption when the image forming apparatus is in the electric power saving mode, in the case where the image forming apparatus has the functions of a plurality of electric power modes whose electric power consumptions differ from each other, as the electric power saving modes.

Further, the above configuration is advantageous in shortening the time required for the image forming apparatus to recover to the ready mode, as compared with a configuration, in which the second electric power control is executed in the whole period of the low electric power mode, in other words, as compared with a configuration in which the sleep mode is performed.

Figure 4:
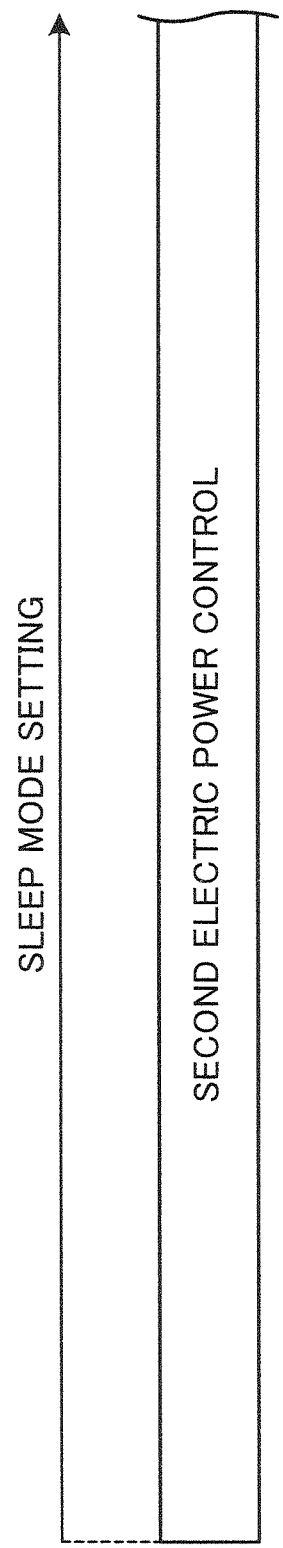
FIG. 4 is a diagram illustrating an electric power control to be executed when the image forming apparatus is set to a sleep mode.

Further, as illustrated in FIG. 4, the electric power control unit 509 executes the second electric power control, when the sleep mode is set by the mode setting unit 507.

The input receiving unit 511 receives an operation input indicating that a ready mode period or a low electric power mode period (a predetermined period) is set by the mode setting unit 507. A user or a service person is allowed to set the durations of these periods by operating the operating unit 400.

In the ready mode, in the case where the operation key unit 401 of the operating unit 400 is not operated for a predetermined time, or in the case where the print receiving unit 503 does not receive a print instruction for a predetermined time, the image forming apparatus 1 is shifted from the ready mode to the low electric power mode. The aforementioned predetermined time is the ready mode period. In the low electric power mode, in the case where the operation key unit 401 of the operating unit 400 is not operated for a predetermined time, or in the case where the print receiving unit 503 does not receive a print instruction for a predetermined time, the image forming apparatus 1 is shifted from the low electric power mode to the sleep mode. The aforementioned predetermined time is the low electric mode period. It should be noted that the aforementioned predetermined period is the aforementioned predetermined time.

The electric power control unit 509 executes the following control (a) or control (b) in accordance with a low electric power mode period set by the mode setting unit 507 in response to an operation input.

(a) The electric power control unit 509 executes the energy-saving control when the low electric power mode is set by the mode setting unit 507, in the case where a low electric power mode period set by the operation input is longer than a predetermined reference period.

(b) The electric power control unit 509 executes the first electric power control without including a second electric power control period in a low electric power mode period when the low electric power mode is set by the mode setting unit 507, in the case where the low electric power mode period set by the operation input is not longer than the predetermined reference period.

There is a case that the user sets the low electric power mode period to be longer than the predetermined reference period in order to take advantage of the convenience for the user and to avoid a possibility that the image forming apparatus 1 is switched to the sleep mode. In this case, as described in the control (a), forcibly executing the energy-saving control makes it possible to prevent an increase in electric power consumption of the image forming apparatus 1. On the other hand, when the low electric power mode period is set to be not longer than the reference period, as described in the control (b), the energy-saving control is not executed during the low electric power mode period. In other words, the first electric power control is executed without executing the second electric power control.

Figure 5:
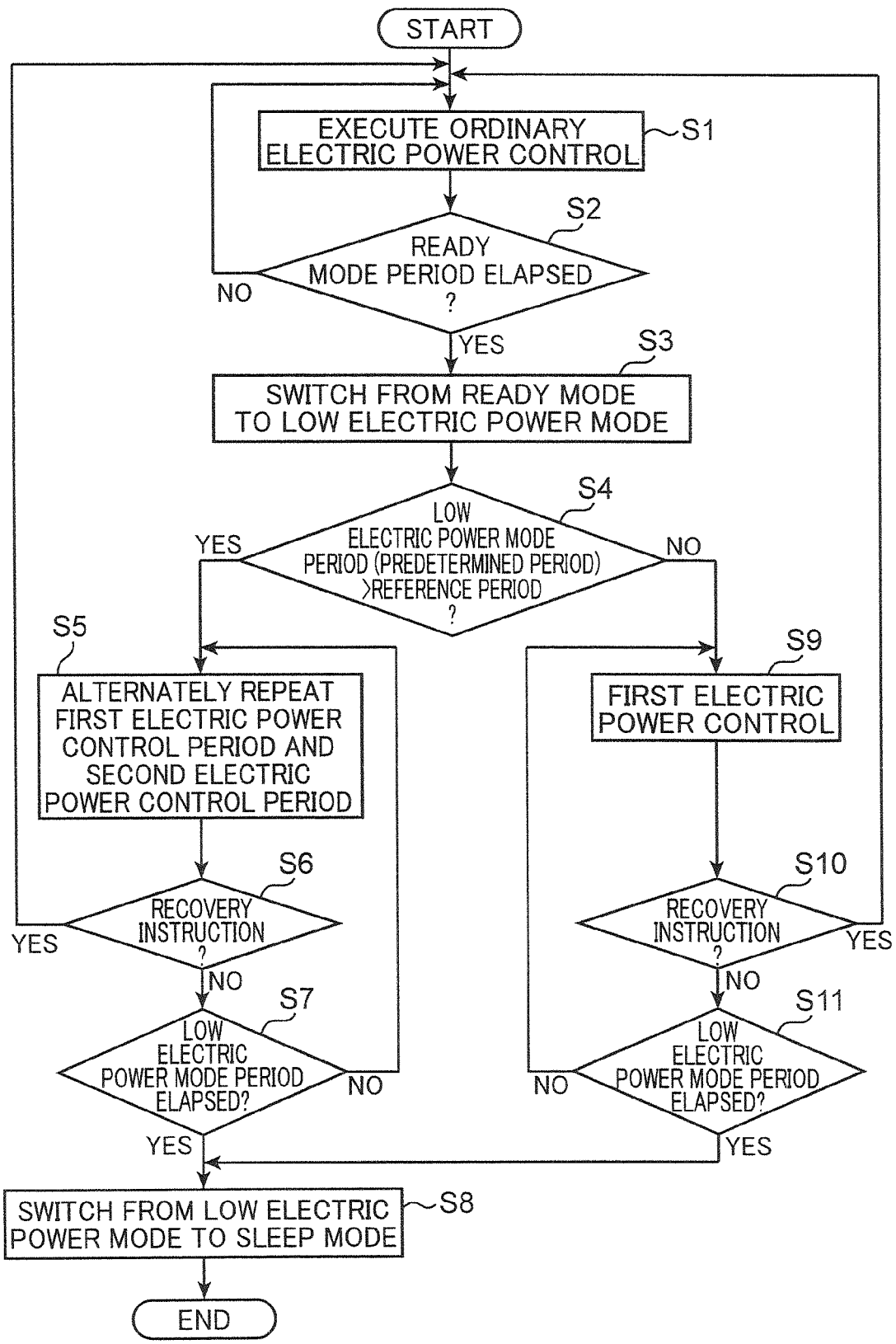
FIG. 5 is a flowchart illustrating an electric power saving mode to be performed by the image forming apparatus according to the first embodiment.

FIG. 5 is a flowchart for describing an electric power saving mode to be performed by the image forming apparatus 1 according to the first embodiment. The description is started from a state that the ready mode is set by the mode setting unit 507. The electric power control unit 509 executes the ordinary electric power control (in Step S1).

The mode setting unit 507 judges whether a predetermined ready mode period is elapsed without receiving a print instruction by the print receiving unit 503, after the image forming apparatus 1 is set to the ready mode (in Step S2). In the case where the mode setting unit 507 judges that the ready mode period is not elapsed (NO in Step S2), the process returns to Step S1.

In the case where the mode setting unit 507 judges that the ready mode period is elapsed (YES in Step S2), the mode setting unit 507 switches the setting from the ready mode to the low electric power mode (in Step S3).

The electric power control unit 509 judges whether a low electric power mode period (a predetermined period) set by the mode setting unit 507 is longer than a predetermined reference period (in Step S4).

In the case where the electric power control unit 509 judges that the low electric power mode period is longer than the reference period (YES in Step S4), the electric power control unit 509 executes the energy-saving control of alternately repeating a first electric power control period and a second electric power control period (in Step S5).

The mode setting unit 507 judges whether a recovery instruction (a recovery instruction indicating that the image forming apparatus 1 is recovered to the ready mode) is received by the recovery receiving unit 505 (in Step S6).

In the case where the mode setting unit 507 judges that the recovery instruction is received by the recovery receiving unit 505 (YES in Step S6), the mode setting unit 507 switches the setting from the low electric power mode to the ready mode, and the process returns to Step S1.

In the case where the mode setting unit 507 judges that the recovery instruction is not received by the recovery receiving unit 505 (NO in Step S6), the mode setting unit 507 judges whether the low electric power mode period is elapsed (in Step S7).

In the case where the mode setting unit 507 judges that the low electric power mode period is not elapsed (NO in Step S7), the process returns to Step S5.

In the case where the mode setting unit 507 judges that the low electric power mode period is elapsed (YES in Step S7), the mode setting unit 507 switches the setting from the low electric power mode to the sleep mode (in Step S8). Subsequently, the electric power control unit 509 executes the second electric power control.

On the other hand, in the case where the electric power control unit 509 judges that the low electric power mode period is not longer than the reference period (NO in Step S4), the electric power control unit 509 executes the first electric power control without including the second electric power control period in the low electric power mode period (in Step S9).

The mode setting unit 507 judges whether a recovery instruction (a recovery instruction indicating that the image forming apparatus 1 is recovered to the ready mode) is received by the recovery receiving unit 505 (in Step S10).

In the case where the mode setting unit 507 judges that the recovery instruction is received by the recovery receiving unit 505 (YES in Step S10), the mode setting unit 507 switches the setting from the low electric power mode to the ready mode, and the process returns to Step S1.

In the case where the mode setting unit 507 judges that the recovery instruction is not received by the recovery receiving unit 505 (NO in Step S10), the mode setting unit 507 judges whether the low electric power mode period is elapsed (in Step S11).

In the case where the mode setting unit 507 judges that the low electric power mode period is not elapsed (NO in Step S11), the process returns to Step S9.

In the case where the mode setting unit 507 judges that the low electric power mode period is elapsed (YES in Step S11), the mode setting unit 507 switches the setting from the low electric power mode to the sleep mode (in Step S8). Subsequently, the electric power control unit 509 executes the second electric power control.

As described above, according to the first embodiment, it is possible to prevent an increase in electric power consumption of the image forming apparatus 1, which may occur when a low electric power mode period is set to be longer than a predetermined reference period in order to take advantage of the convenience for the user and to avoid a possibility that the image forming apparatus 1 is switched to the sleep mode. In other words, in the above case, forcibly executing the energy-saving control (YES in Step S4, and Step S5) makes it possible to prevent an increase in electric power consumption of the image forming apparatus 1. On the other hand, when the low electric power mode period is set to be not longer than the reference period, the energy-saving control is not executed during the low electric power mode period. In other words, the first electric power control is executed without executing the second electric power control (NO in Step S4, and Step S9).

Alternatively, the energy-saving control may be forcibly executed during a low electric power mode period, regardless of the duration of the low electric power mode period (in other words, by skipping Step S4).

Figure 6:
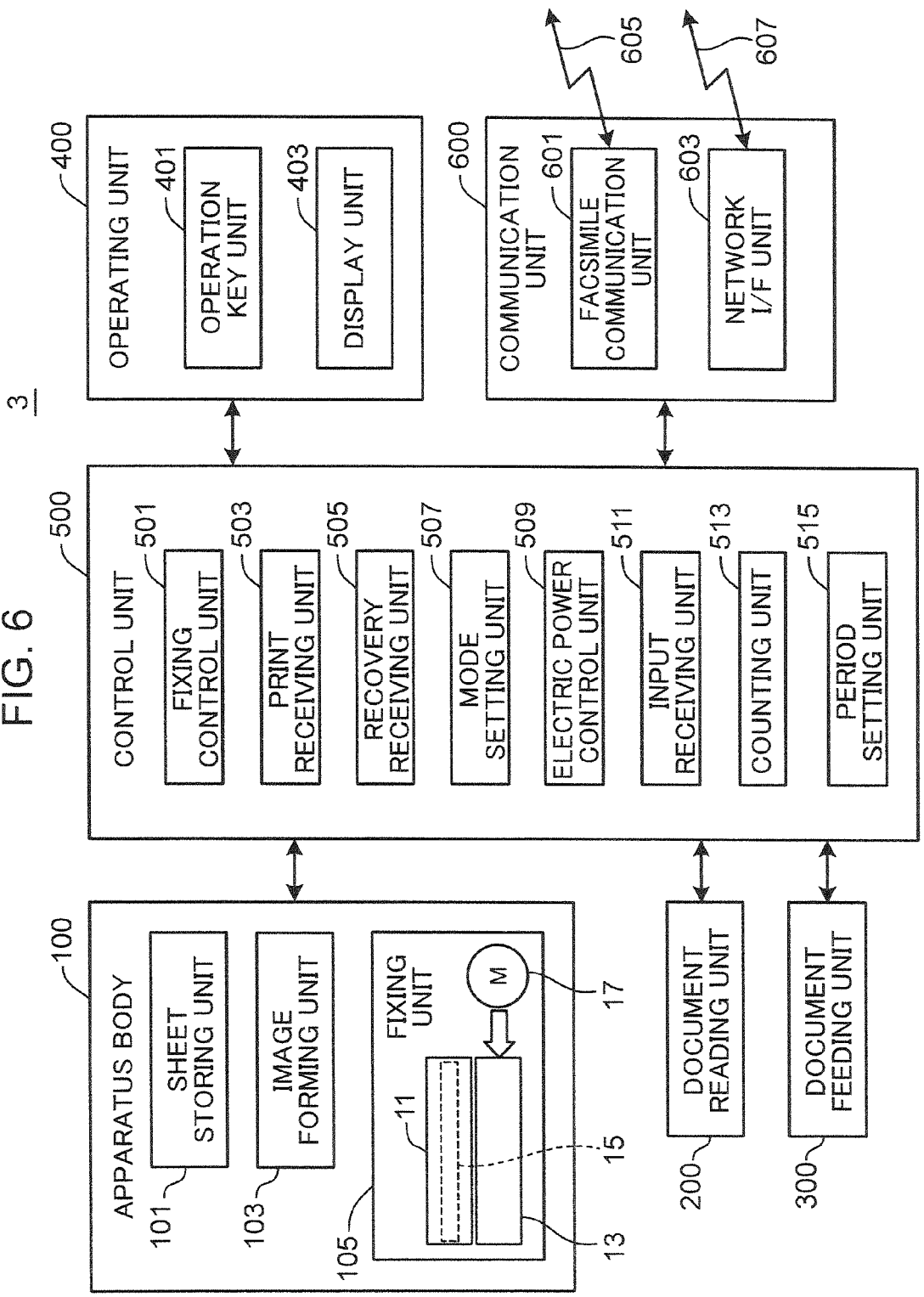
FIG. 6 is a block diagram illustrating a configuration of an image forming apparatus according to a second embodiment.

Next, an image forming apparatus 3 according to a second embodiment is described mainly on the difference between the image forming apparatus 3 and the image forming apparatus 1 according to the first embodiment. FIG. 6 is a block diagram illustrating a configuration of the image forming apparatus 3 according to the second embodiment. The constituent elements of the image forming apparatus 3 substantially identical or equivalent to those of the image forming apparatus 1 according to the first embodiment are indicated with the same reference numerals, and the description thereof is omitted herein.

According to the second embodiment, a control unit 500 is further provided with a counting unit 513 and a period setting unit 515, in addition to a fixing control unit 501, a print receiving unit 503, a recovery receiving unit 505, a mode setting unit 507, an electric power control unit 509, and an input receiving unit 511 as functional blocks.

The counting unit 513 counts the number of times of a recovery instruction received by the recovery receiving unit 505 for a preset period (e.g. for several weeks, for one month, or for several months), without elapse of a low electric power mode period (a predetermined period), when a low electric power mode is set by the mode setting unit 507.

Figure 7:
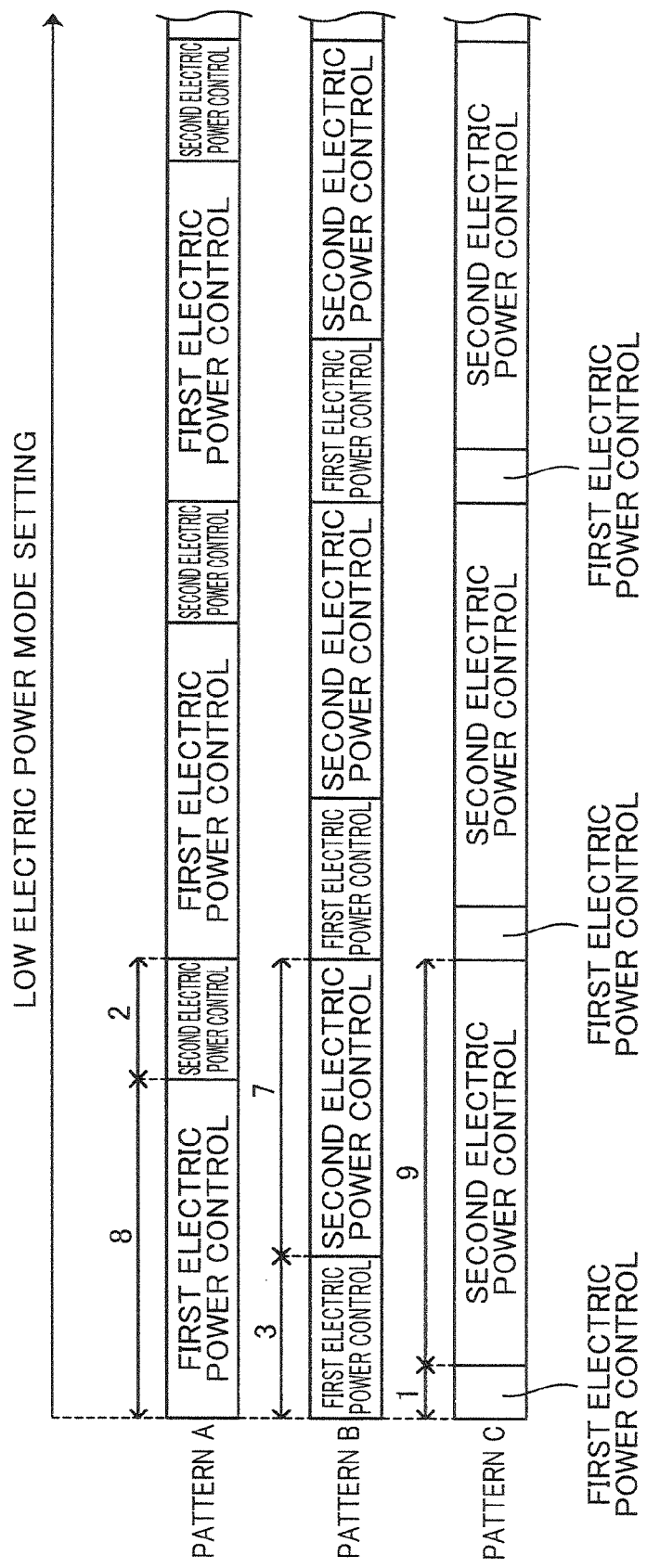
FIG. 7 is a diagram illustrating patterns of ratios between a first electric power control period and a second electric power control period.

The period setting unit 515 stores in advance ratio data of patterns A, B, and C illustrated in FIG. 7. The pattern A is such that the ratio between a first electric power control period and a second electric power control period is 8:2. The pattern B is such that the ratio between a first electric power control period and a second electric power control period is 3:7. The pattern C is such that the ratio between a first electric power control period and a second electric power control period is 1:9.

The period setting unit 515 converts the number of times of a recovery instruction counted by the counting unit 513 after elapse of the preset period into the number of times of a recovery instruction per sixty minutes. For instance, when the number of times of a recovery instruction per sixty minutes is not smaller than 10, the period setting unit 515 assigns the pattern A; when the number of times of a recovery instruction per sixty minutes is larger than 5 but smaller than 10, the period setting unit 515 assigns the pattern B; and when the number of times of a recovery instruction per sixty minutes is not larger than 5, the period setting unit 515 assigns the pattern C.

As described above, the period setting unit 515 presets the ratio between a first electric power control period and a second electric power control period in accordance with the number of times of a recovery instruction counted by the counting unit 513 after elapse of a preset period. The period setting unit 515 sets the ratio such that (c) a ratio of the first electric power control period increases and a ratio of the second electric power control period decreases, as the number of times of a recovery instruction increases. In other words, the period setting unit 515 sets the ratio such that (d) a ratio of the first electric power control period decreases, and a ratio of the second electric power control period increases, as the number of times of a recovery instruction decreases.

The electric power control unit 509 executes an energy-saving control at the ratio between a first electric power control period and a second electric power control period set by the period setting unit 515.

The second electric power control is such that the electric power consumption of the image forming apparatus is small, as compared with the first electric power control. Therefore, setting the ratio of a second electric power control period to be large and setting the ratio of a first electric power control period to be small in the energy-saving control makes it possible to remarkably reduce the electric power consumption, but the time required for the image forming apparatus 3 to recover from the electric power saving mode is extended. On the other hand, setting the ratio of a first electric power control period to be large and setting the ratio of a second electric power control period to be small in the energy-saving control makes it possible to shorten the time required for the image forming apparatus 3 to recover from the electric power saving mode, but an advantageous effect of reducing the electric power consumption cannot be expected.

In view of the above, according to the second embodiment, the counting unit 513 counts the number of times of a recovery instruction received by the recovery receiving unit 505, without elapse of a predetermined period, when the first power saving mode is set by the mode setting unit 507. In other words, the counting unit 513 counts the number of times of recovery from the electric power saving mode during a first power saving mode period, without switching the image forming apparatus 3 from a first power saving mode to a second power saving mode. The ratio between a first electric power control period and a second electric power control period in the energy-saving control is changed in accordance with the actual counted number of times.

In the case where the number of times counted by the counting unit 513 is small, it is highly likely that the image forming apparatus 3 is switched to the second power saving mode, without recovering from the electric power saving mode during a first power saving mode period. Accordingly, setting the ratio of the first electric power control period to be small and setting the ratio of the second electric power control period to be large is advantageous in enhancing the effect of reducing the electric power consumption.

On the other hand, in the case where the number of times counted by the counting unit 513 is large, it is highly likely that the image forming apparatus 3 is recovered from the electric power saving mode to the ordinary mode (ready mode) during a first power saving mode period, without switching the image forming apparatus 3 from the first power saving mode to the second power saving mode. Accordingly, setting the ratio of a first electric power control period to be large and setting the ratio of a second electric power control period to be small is advantageous in shortening the time required for the image forming apparatus 3 to recover from the electric power saving mode to the ordinary mode.

It should be noted that the period setting unit 515 is configured to set the ratio of a second electric power control period to zero as an initial setting. In the case where the initial setting is set by the period setting unit 515 when the low electric power mode is set by the mode setting unit 507, the electric power control unit 509 executes the first electric power control without including the second electric power control period. As described above, in the initial setting set by the period setting unit 515, the first electric power control is executed without executing the energy-saving control. Further, in the energy-saving control, the ratio between a first electric power control period and a second electric power control period is set in accordance with the actual number of times counted by the counting unit 513.

Further, in the second embodiment, the fixing control unit 501 executes the following control (e) or (f) when the low electric power mode is set by the mode setting unit 507.

(e) The fixing control unit 501 causes a fixing unit 105 to perform a process of fixing a toner image by heating a sheet having the toner image formed thereon at a first temperature by a heating portion (a heater 15 and a fixing roller 11), while feeding the sheet at a first speed by a feeding portion (the fixing roller 11, a pressing roller 13, and a motor 17), in the case where a print instruction is received by the print receiving unit 503 during a first electric power control period, and (f) The fixing control unit 501 causes the fixing unit 105 to perform a process of fixing a toner image by heating a sheet having the toner image formed thereon at a second temperature lower than the first temperature by the heating portion, while feeding the sheet at a second speed slower than the first speed by the feeding portion, in the case where a print instruction is received by the print receiving unit 503 during a second electric power control period.

The mode setting unit 507 supplies electric power during both of the first electric power control period and the second electric power control period. The mode setting unit 507 determines whether the time when a print instruction is received by the print receiving unit 503 is in the first electric power control period or in the second electric power control period when the image forming apparatus 3 is in the low electric power mode.

In the low electric power mode, the heating portion is activated during a first electric power control period, and the heating portion is deactivated during a second electric power control period. Therefore, in the case where a print instruction is received by the print receiving unit 503 during a second electric power control period when the image forming apparatus 3 is in the low electric power mode, the time required for the image forming apparatus 3 to start printing after the print instruction is received may be longer than the time expected by the user. As a result, the user may misjudge that the low electric power mode is in an anomaly state.

In view of the above, the image forming apparatus 3 is configured such that a fixing process is performed by lowering the fixing temperature from the first temperature to the second temperature in order to shorten the time required for the image forming apparatus 3 to start printing after a print instruction is received as much as possible, in the case where the print instruction is received by the print receiving unit 503 during a second electric power control period when the image forming apparatus 3 is in the low electric power mode. Further, the sheet feeding speed by the feeding portion is controlled to shift from the first speed to the second speed (e.g. a speed substantially half as slow as the first speed) so that a sheet having a toner image formed thereon is sufficiently heated, regardless of a decrease of the fixing temperature.

The above configuration makes it possible not to make the time required for the image forming apparatus 3 to start printing after a print instruction is received, longer than the time expected by the user, in the case where the print instruction is received by the print receiving unit 503 during a second electric power control period when the image forming apparatus 3 is in the low electric power mode. Further, the above configuration is advantageous in reducing the electric power consumption required for fixation.

In particular, it is conceived that the temperature of the fixing roller 11 may be considerably lowered, in the case where the ratio of a first electric power control period is larger than the ratio of a second electric power control period. Accordingly, the second embodiment is advantageously effective.

In the first and second embodiments, the image forming unit 103 forms an electrostatic latent image represented by image data on the photosensitive drum 113, and a toner image obtained by developing the electrostatic latent image with toner is transferred onto a sheet. The image forming unit 103 may be desirably configured, as far as a toner image obtained by developing a latent image with toner is formed on a sheet. In view of the above, the image forming unit 103 may be configured such that a toner image obtained by developing a magnetic latent image represented by image data with toner is transferred onto a sheet.

Further, as illustrated in FIG. 2 and FIG. 6, in the first and second embodiments, the heater 15 of the fixing unit 105 is disposed in the inside of the tubular-shaped fixing roller 11. The present disclosure is not limited to the above. A heater roller may be heated by a heater, and heat from the heater roller may be transferred to a fixing roller via an endless fixing belt wound around the heater roller and the fixing roller.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An electronic equipment configured to control electric power consumption of the electronic equipment, comprising:
    an electric power control unit configured to execute an ordinary electric power control, as an electric power control of an ordinary mode, and configured to selectively execute a first electric power control and a second electric power control as electric power controls of electric power saving modes, the first electric power control being such that the electric power consumption is smaller than in the ordinary electric power control, the second electric power control being such that the electric power consumption is smaller than in the first electric power control;

a recovery receiving unit configured to receive a recovery instruction indicating that the electronic equipment is recovered from the electric power saving mode to the ordinary mode; and a mode setting unit configured to selectively set a first power saving mode and a second power saving mode as the electric power saving modes, and configured to switch setting of the electronic equipment from the first power saving mode to the second power saving mode when a predetermined period is elapsed without receiving the recovery instruction by the recovery receiving unit after the electronic equipment is set to the first power saving mode;

a counting unit configured to count the number of times of the recovery instruction received by the recovery receiving unit for a preset period, without elapse of the predetermined period, when the first power saving mode is set by the mode setting unit; and a period setting unit configured to set a ratio between the first electric power control period and the second electric power control period in accordance with the number of times of the recovery instruction counted by the counting unit after elapse of the preset period, wherein the electric power control unit executes an energy-saving control having a first electric power control period and a second electric power control period when the first power saving mode is set by the mode setting unit, executes the second electric power control when the second power saving mode is set by the mode setting unit, and executes the energy-saving control at the ratio between the first electric power control period and the second electric power control period set by the period setting unit.

2. The electronic equipment according to claim 1, wherein the electric power control unit alternately repeats the first electric power control period and the second electric power control period, as the energy-saving control.

3. The electronic equipment according to claim 1, further comprising:
an input receiving unit configured to receive an operation input indicating that the predetermined period is set by the mode setting unit, wherein
the electric power control unit
(a) executes the energy-saving control when the first power saving mode is set by the mode setting unit, in the case where the predetermined period set by the operation input is longer than a predetermined reference period, and
(b) executes the first electric power control without including the second electric power control period when the first power saving mode is set by the mode setting unit, in the case where the predetermined period set by the operation input is not longer than the predetermined reference period.

4. The electronic equipment according to claim 1, wherein the period setting unit
(c) sets the ratio such that a ratio of the first electric power control period increases and a ratio of the second electric power control period decreases, as the number of times of the recovery instruction increases, and
(d) sets the ratio such that the ratio of the first electric power control period decreases, and the ratio of the second electric power control period increases, as the number of times of the recovery instruction decreases.

5. The electronic equipment according to claim 1, wherein the period setting unit sets a ratio of the second electric power control period to zero as an initial setting, and
the electric power control unit executes the first electric power control without including the second electric power control period, in the case where the initial setting is set by the period setting unit when the mode setting unit sets the first power saving mode.

6. The electronic equipment according to claim 1, further comprising:
an image forming unit configured to form a toner image obtained by developing a latent image with toner on a sheet;
a feeding portion configured to feed the sheet having the toner image formed thereon while applying a pressure to the sheet;
a heating portion configured to apply heat to the sheet having the toner image formed thereon; and
a fixing unit configured to fix the toner image formed on the sheet onto the sheet by applying the heat and the pressure to the sheet, wherein
the electric power control unit activates the heating portion by the first electric power control, and de-activates the heating portion by the second electric power control.

7. The electronic equipment according to claim 6, further comprising:
a print receiving unit configured to receive a print instruction; and
a fixing control unit configured to control the fixing unit, wherein
when the first power saving mode is set by the mode setting unit, the fixing control unit
(e) causes the fixing unit to perform a process of fixing the toner image by heating the sheet having the toner image formed thereon at a first temperature by the heating portion, while feeding the sheet at a first speed by the feeding portion, in the case where the print instruction is received by the print receiving unit during the first electric power control period, and
(f) causes the fixing him and him and him and him and him and him and him and unit to perform a process of fixing the toner image by heating the sheet having the toner image formed thereon at a second temperature lower than the first temperature by the heating portion, while feeding the sheet at a second speed slower than the first speed by the feeding portion, in the case where the print instruction is received by the print receiving unit during the second electric power control period.

* * * * *